H. ANHALTZER.
APPARATUS FOR MAKING SOLUBLE COFFEE AND OTHER PRODUCTS.
APPLICATION FILED APR. 28, 1919.
1,358,048.
Patented Nov. 9, 1920.
2 SHEETS—SHEET 1.
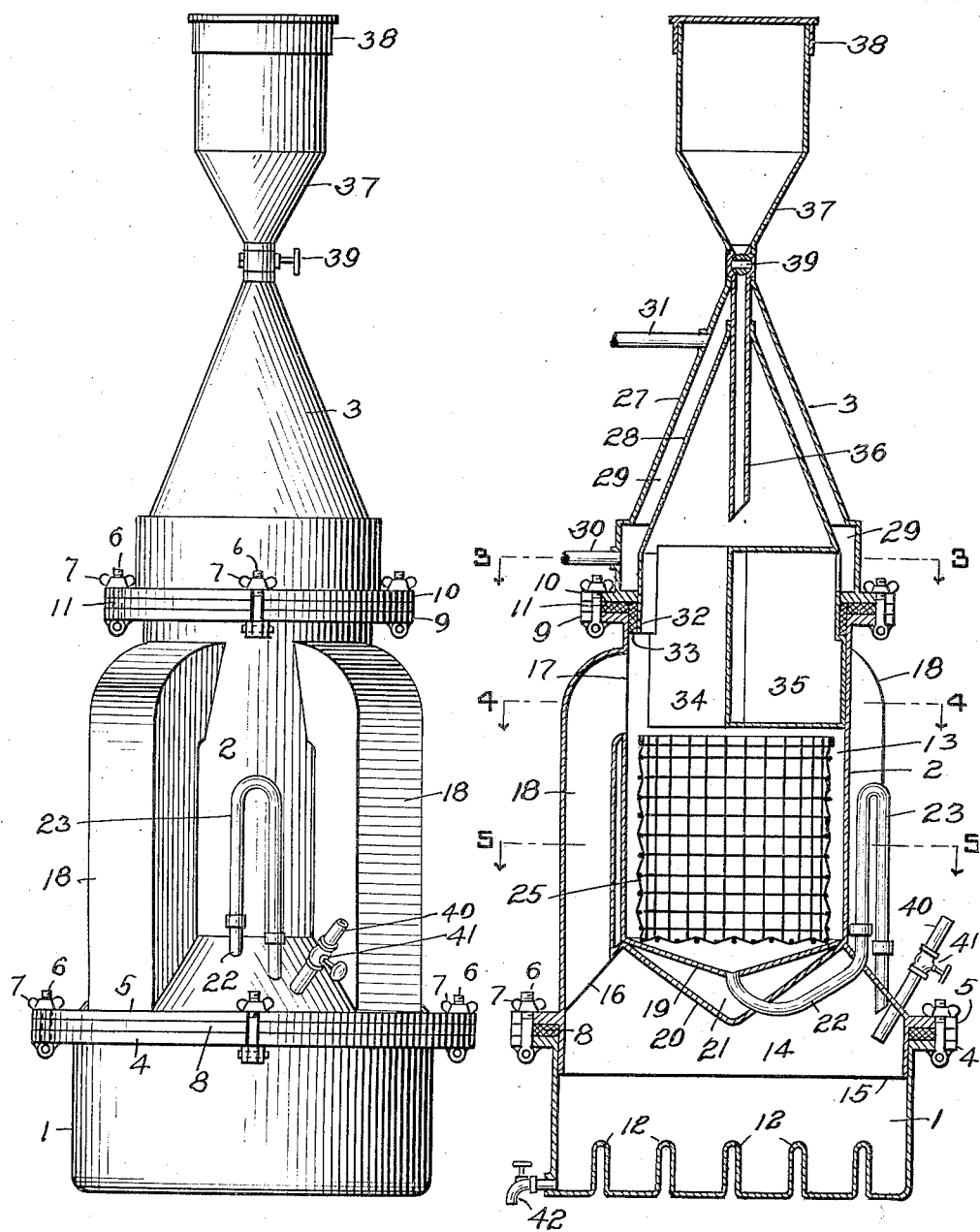

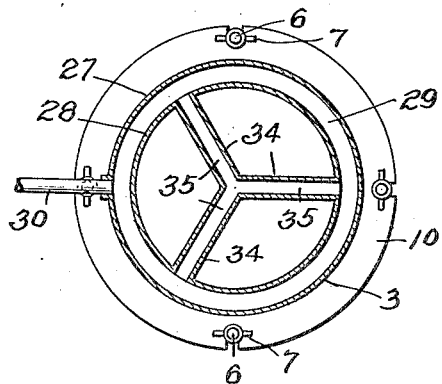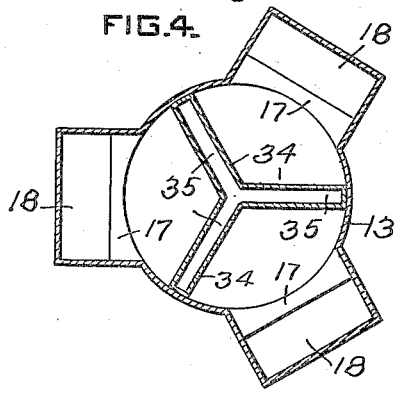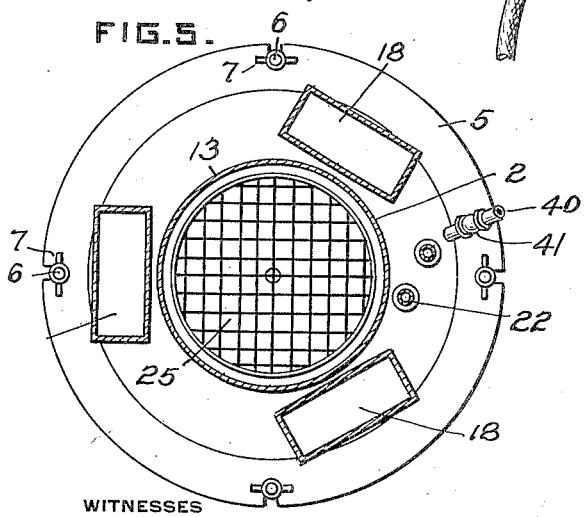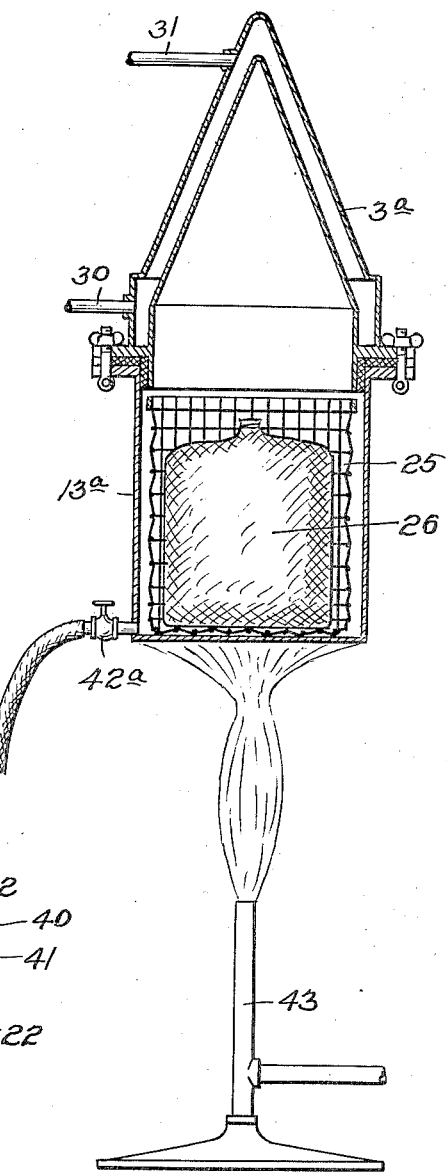

UNITED STATES PATENT OFFICE.

HENRY ANHALTZER, OF PITTSBURGH, PENNSYLVANIA

APPARATUS FOR MAKING SOLUBLE COFFEE AND OTHER PRODUCTS.

1,358,048.        Specification of Letters Patent.        Patented Nov. 9, 1920.

Application filed April 28, 1919. Serial No. 293,257.

*To all whom it may concern:*

Be it known that I, HENRY ANHALTZER, a citizen of the United States, and a resident of Pittsburgh, in the county of Allegheny and State of Pennsylvania, have invented a new and useful Improvement in Apparatus for Making Soluble Coffee and other Products, of which the following is a specification.

This invention relates to apparatus for extracting soluble and volatile ingredients from solids, by means of liquid solvents.

The apparatus is designed to be used in laboratories and also for commercial purposes on a large scale for automatically and continually extracting by means of water or volatile solvents like alcohol, ether, chloroform, etc., substances like perfume rendering bodies, oil seeds, or, as in this particular case, coffee beans, etc.

The object of the invention is to provide apparatus whereby the extraction may be effected without loss of the aroma by diffusion or volatilization, to guard against loss of the solvent by volatilization, and to secure rapidity of operation with the least consumption of fuel. A further and the special object of the invention is to provide an apparatus for extracting the soluble constituents of ground coffee beans for producing a soluble coffee as described and claimed in my application Serial No. 261,898, filed November 9, 1918, for method of making soluble coffee; and to provide an apparatus which will replace the usual coffee percolator in homes, restaurants, etc.

In the accompanying drawings Figure 1 is a side elevation of one embodiment of an apparatus involving the invention; Fig. 2 is a vertical section therethrough; Figs. 3, 4 and 5 are horizontal sectional views taken respectively on the lines 3—3, 4—4 and 5—5, Fig. 2; and Fig. 6 is a vertical sectional view of a modified form of apparatus.

The apparatus illustrated in Figs. 1 to 5 comprises three essential parts, to wit, a bottom vessel or chamber 1, constituting in effect a boiler, an intermediate vessel or chamber 2, constituting the main body or extracting portion of the apparatus, and a top portion 3, constituting a condenser. All of these parts can be formed of any suitable metal, such as coated iron, copper, aluminum or the like, enameled if desired on the inside, or porcelain or glass. The several sections are formed so that they can be secured together and hermetically sealed at the joints. To this end the bottom vessel 1, is shown as provided at its top with an annular flange 4, arranged to clamp to a similar flange 5 on the lower end of the intermediate section 2, preferably by means of bolts 6 hinged to the lower section arranged to swing into radial slots in the flange 5, and provided with thumb nuts, or the like, 7 for clamping said flanges together. A suitable gasket 8 is placed between the flanges to form a hermetically sealed joint. Similarly the upper end of the intermediate section is provided with an annular flange 9 arranged to be clamped to an annular flange 10 on the lower end of the condenser 3 by means of similar hinged clamping bolts 6 provided with clamping nuts 7. At this point also a gasket 11 is imposed between the flanges 9 and 10 to form a hermetically sealed joint at that point, said gasket being formed of a material which forms a heat insulator between these parts, for a purpose hereinafter described.

The lower section or boiler 1 is adapted to have heat applied thereto in any suitable way, such as by setting the same on a stove, or applying a burner of any suitable character to its bottom, or heating the same by means of steam coils applied either internally or externally, or by an electric heater, or in any other suitable way. It is shown as adapted to have heat applied to its bottom, and to increase the heat absorbing surface, said bottom is provided with a number of upwardly drawn hollow projections 12 which may be in the form of conical projections or ribs extending more or less continuously across the bottom.

The intermediate section comprises a cylindrical vessel 13 having attached to its lower end a flaring section or hood 14, to whose lower edge is secured the annular flange 5. The lower edge of the hood 14 projects somewhat below the flange 5, as shown at 15, to enter into the upper end of the lower vessel 1 and properly position the vessel 2 on the vessel 1. This hood is provided with one or more openings 16, and the cylindrical portion 13 is provided at its upper end with a corresponding number of openings 17, each pair of openings 16 and 17 being connected by a vapor tube 18 shown as of rectangular form in cross section. The particular apparatus illustrated is provided with three such vapor tubes, but any number, either one or more, can be used. The larger the apparatus, generally the greater will be the number of said vapor tubes. The chamber in the cylindrical portion 13 is provided with a double bottom, to wit an inner bottom 19 and a lower bottom 20, with a space 21 therebetween in order that the chamber in the cylindrical portion 13 be insulated from the heat in the boiler 1. Both of these bottoms are shown of inverted conical form, and at the apex of the inner bottom is a small opening to which is connected a tube 22 which extends through the lower bottom and then turns upwardly and projects through the hood 14 on the outside of the cylindrical portion 13. The points where this tube passes through the lower bottom 20 and the hood 14 are hermetically sealed by solder or other suitable means. Connected to the end of tube 22 is a siphon tube 23, preferably of glass, which projects upwardly to a considerable distance and then turns downwardly and extends through the hood 14, and has an open end projecting into the boiler 1, the opening through the hood 14 at this point also being hermetically sealed.

Within the cylindrical portion 13 is a cylindrical cage or basket 25 formed preferably of wire fabric or of perforated metal for containing the solid substance to be subjected to the extracting operation. In the case of coffee, the ground coffee will be put into a bag of cotton, silk, linen or other fabric 26 and then placed inside of the basket 25. This basket extends upwardly nearly to the lower edges of the vapor openings 17.

The top section or condenser 3 is shown of conical form provided with an outer wall 27 and an inner wall 28 forming a water space 29 therebetween, which space has connected thereto a water inlet 30 near its bottom and water outlets 31 near its top, so that cold water can be circulated therethrough to keep the same cool. The inner wall 28 is preferably extended downwardly somewhat below the flange 10 to enter the upper end of the cylindrical vessel 13 but not sufficiently far to obstruct the vapor openings 17, as shown at 32. This downwardly projecting portion 32 is preferably of smaller diameter than the vessel 13 and is surrounded by a ring 33 of suitable heat insulating material, which, together with the gasket 11 prevents the heat in the lower portion of the apparatus from being communicated to the condenser.

Inside of the condenser are a number of baffles for preventing the vapors which come up through the vapor tubes from attempting to flow straight across and thus oppose each other, and for directing said vapors upwardly into contact with the inner cool wall of the condenser. As shown the baffles comprise three wings 34 secured to the inner wall of the condenser and project downwardly below the same to substantially the lower edge of the vapor openings 17. The number of the baffles obviously will vary with the number of vapor openings. Preferably these baffles will also be cooled and are shown as formed with double walls leaving therebetween spaces 35, which are open to the water space 29 in the condenser, so that the water in the space 29 also enters the hollow baffles and keeps the latter cool.

Projecting downwardly through the apex of the condenser and hermetically sealed to both the inner and outer walls thereof is a tube 36 to whose upper end is connected a funnel 37, preferably closed by a cover 38. In said tube 36 immediately below the funnel is a cut off cock 39 of any suitable construction, by means of which the opening through the tube can be opened and closed. Preferably also a tap will be provided through the hood 14, this being shown in the form of tube 40 extending through the hood and hermetically sealed therein, and provided outside of the hood with a suitable cut-off cock 41. The boiler 1 is also shown as provided with a draw-off faucet 42, connected at its bottom, through which the solution in said boiler can be drawn off whenever desired.

The operation of the apparatus is as follows:

The boiler 1 and extracting chamber 2 are clamped together by means of the hinged bolts 6, and nuts 7, and the substance to be treated is placed within the perforated or reticulated basket 15, preferably in a fabric bag or casing as hereinbefore described. The condenser is then placed on top of the apparatus and clamped in position. Water connections are established with the inlet 30 and outlet 31 to said condenser, and all of the cocks except the cocks 39 and 41 are closed. The necessary volume of water (when extracting coffee) is heated in any suitable way, and when boiling is poured into the funnel 37 and runs down through the tube 36, permeates the coffee or other substance in the basket 25, taking up partially the soluble constituents therein. The water collects in the cylindrical vessel 13 as a brown colored liquid until it reaches the level of the uppermost bend of the siphon tube 23 when it will start to run down through said tube, thus creating a vacuum in the cylindrical chamber which draws out practically all of the liquid solution from said cylindrical chamber and conducts the same to the bottom chamber or boiler 1 in the well understood action of a siphon. The volume of water or other solvent which is supplied is so chosen as to be sufficient after the solution has been siphoned out once, to fill the cylindrical vessel again at least half full. For extracting coffee a volume of water two and a half times the weight of the coffee is sufficient. The air which is displaced by pouring the boiling water through the funnel is allowed to escape through the tube 40 so that it is evacuated and prevents it from expelling the water upwardly through the tube 36 while the water is being poured into the apparatus. Heat is now applied to the vessel 1 and the liquid therein brought to a boil, the tube 40 having meantime been closed. The vapors thus created pass upwardly through the vapor tubes 18 and into the triangular spaces between adjacent baffle walls 34 and are directed by these upwardly into contact with the inner wall of the condenser 3. The contact of the vapors with the cool baffle walls and condenser walls condenses said vapors into a liquid which flows down into the cylindrical chamber 13, collecting therein and extracting further soluble ingredients from the substance therein until the liquid again reaches the level of the upper end of the siphon 23, when said accumulated liquid is again siphoned out and returned to the boiler 1. This operation is continued repeatedly and takes place automatically until the liquid flowing down through the siphon tube 23 is colorless, or nearly so, when the extracting operation (in the case of coffee) is complete. Since the siphon tube is formed of glass the progress of the extraction can be easily observed.

When the extraction is completed the liquid is drawn from the boiler 1 through faucet 42, and will then be subjected to further treatment depending upon the character of the extract to be formed. In the case of soluble coffee said extract is conducted from this boiler to a suitable evaporating apparatus, for reducing it to the form of a dry solid. This evaporating apparatus obviously can be of various characters, preferably as illustrated and described in my former application Serial No. 261,898, hereinbefore referred to.

The entire apparatus described is air and water tight so that the aroma of the coffee or other volatile ingredients which are extracted cannot escape, and in the case of coffee it will always retain its fresh taste.

The extracting liquid need not be water, but can be alcohol, ether, chloroform or the like, depending upon the substance to be treated. When extracting coffee it may be found desirable to add some alcohol after a certain length of treatment with the hot water. If alcohol is to be added, or if additional water is found necessary, it can be easily supplied during the operation of the apparatus through the funnel 38 and tube 36, by opening the cock 39; or it can be added by connecting a tube to the tap 40 through the hood of the extractor. Likewise any part or all of liquid solution can be withdrawn during the operation of the apparatus through the faucet 42 in the bottom of the boiler.

Fig. 6 shows a simple form of apparatus in which the preliminary boiling of the substance can be effected. This apparatus comprises a cylindrical vessel $13^a$ arranged to receive the basket 25 with the contained substance, and closed at its top by a simple condenser $3^a$, having hollow walls to which water connections 30 and 31 are made to cool said condenser; or the condenser of Fig. 2 may be applied to the vessel $13^a$. The vessel $13^a$ is provided near its bottom with a draw-off faucet $42^a$. In the use of this apparatus the substance to be treated is placed in the basket 25, and placed in the vessel $13^a$ together with a suitable liquid, such as water. The top $3^a$ is then applied, the water circulation established to the said top, and heat applied to the bottom of said vessel, which can be conveniently done by means of a Bunsen burner 43. The water will be added in a calculated volume sufficient to cover the material being treated. The material is then boiled, say for about fifteen minutes, the generated steam being condensed by the cold top $3^a$ and falling back into the vessel. After being treated the right length of time the liquid extract is transferred to the boiler 1 of the apparatus shown in Fig. 2. Preferably this transfer is made without permitting the liquid extract coming into contact with the air, such as connecting the faucet 42 to tap 40 of the main apparatus by means of a rubber tube 44. The coffee or other material and the basket 25 are then removed from vessel $13^a$ and placed in the vessel 13 of the main apparatus. The top 3 is clamped into position and the material then subjected to further extraction in the main apparatus in the manner already described. By subjecting the coffee to the preliminary boiling in the apparatus $13^a$ the operations in the main apparatus need not be repeated so often.

Various modifications obviously can be made in the form of the apparatus and the arrangement of the three essential parts, relative to each other. They need not necessarily be built up in a single unit as illustrated. Obviously also a number of individual extractors and condensers can be connected to a single boiler.

I claim:

1. An apparatus for the purpose specified comprising, in combination, a vessel having a chamber for containing the material to be treated, together with a liquid, a chamber to which heat can be applied, located below the first named chamber, a siphon connecting said chamber for periodically drawing the liquid from the upper chamber and conducting it to the lower chamber, and a condenser arranged to receive the vapors from the second named chamber, condense the same and direct the condensation back to the first named chamber.

2. An apparatus for the purpose specified comprising, in combination, a vessel having a chamber for containing the material to be treated, together with a liquid, a chamber to which heat can be applied, located below the first named chamber, a siphon connecting said chamber for periodically drawing the liquid from the upper chamber and conducting it to the lower chamber, a closure for the top of the first named chamber, means to cool said closure, and means for directing the vapors from the second named chamber to said closure, whereby said vapors are condensed and the condensation directed into the first named chamber.

3. An apparatus for the purpose specified comprising, in combination, a vessel having a chamber for containing the material to be treated, together with a liquid, a second chamber to which heat can be applied, located below the first named chamber, a siphon connecting said chamber to periodically draw the liquid from the upper chamber and conduct the same to the lower chamber, a condenser closing the top of the first named chamber, vapor flues leading from the lower chamber to the top of the upper chamber underneath said condenser, and baffles arranged to direct the vapors from said vapor flues into contact with said condenser.

4. An apparatus for the purpose specified comprising, in combination, a vessel having a chamber for containing the material to be treated, together with a liquid, a second chamber to which heat can be applied, located below the first named chamber, a siphon connecting said chamber to periodically draw the liquid from the upper chamber and conduct the same to the lower chamber, vapor flues leading from the lower chamber to the top of the upper chamber underneath said condenser, baffles arranged to direct the vapors from said vapor flues into contact with said condenser, and means to cool said baffles.

5. An apparatus for the purpose specified comprising, in combination, a vessel having a chamber to contain the substance to be treated, together with a liquid, a chamber to which heat can be applied located below the first named chamber, siphoning means for withdrawing liquid from the upper chamber and conducting it to the lower chamber, vapor flues leading from the lower chamber and entering the upper chamber near its top, a closure for the top of the upper chamber provided with hollow walls, and means to circulate a cooling medium through said hollow walls.

6. An apparatus for the purpose specified comprising, in combination, a vessel having a chamber to contain the substance to be treated, together with a liquid, a chamber to which heat can be applied located below the first named chamber, siphoning means for withdrawing liquid from the upper chamber and conducting it to the lower chamber, vapor flues leading from the lower chamber and entering the upper chamber near its top, a closure for the top of the upper chamber provided with hollow walls, means to circulate a cooling medium through said hollow walls, and baffles arranged in said closure and projecting downwardly below the opening of the vapor flues to direct the vapors upwardly against said cooled closure.

7. An apparatus for the purpose specified comprising, in combination, a vessel having a chamber to contain the substance to be treated, together with a liquid, a chamber to which heat can be applied located below the first named chamber, siphoning means for withdrawing liquid from the upper chamber and conducting it to the lower chamber, vapor flues leading from the lower chamber and entering the upper chamber near its top, a closure for the top of the upper chamber provided with hollow walls, means to circulate a cooling medium through said hollow walls, and baffles arranged in said closure and projecting downwardly below the openings of the vapor flues to direct the vapors upwardly against said cooled closure, said baffles being hollow and having their interiors connected to the hollow walls of the closure to thereby receive the cooled medium.

In testimony whereof, I have hereunto set my hand.

HENRY ANHALTZER.

Witness:
 ALICE A. TRILL.